Nov. 14, 1961     C. B. ESTES ET AL     3,008,661
ANTISNUBBER ARRANGEMENT FOR FILM HANDLING APPARATUS
Filed Feb. 2, 1959
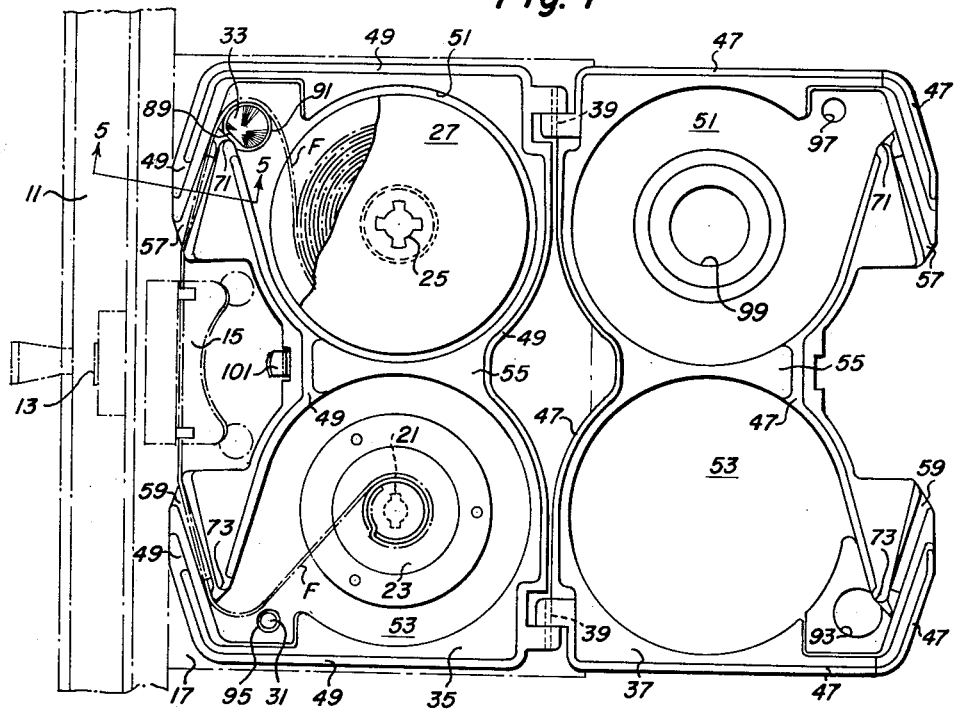
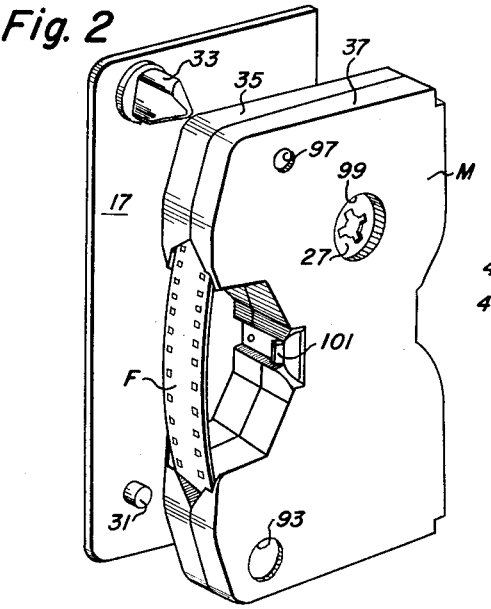
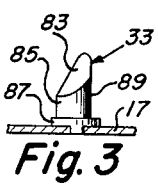
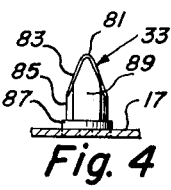
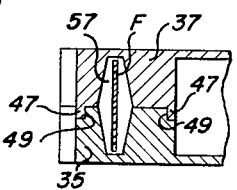
CAMERON B. ESTES
KENNETH W. THOMSON
INVENTORS
BY
ATTORNEYS

United States Patent Office 3,008,661
Patented Nov. 14, 1961

3,008,661
ANTISNUBBER ARRANGEMENT FOR FILM HANDLING APPARATUS
Cameron B. Estes and Kenneth W. Thomson, Rochester, N.Y., assignors to Eastman Kodak Company, Rochester, N.Y., a corporation of New Jersey
Filed Feb. 2, 1959, Ser. No. 790,554
2 Claims. (Cl. 242—55.13)

The present invention relates to a film handling apparatus and more particularly to an antisnubber arrangement for use in a film handling apparatus.

The antisnubber arrangement of the present invention has been illustrated in the drawings as and will be hereinafter described in conjunction with a magazine-type 8 mm. motion-picture camera but it should be understood that the antisnubber arrangement can be used equally advantageously in other magazine receiving strip handling apparatus such as, for example, projectors, other cameras, and miscellaneous sound recording devices. As is well known in the art, magazines used in 8 mm. motion-picture cameras are designed to receive two film spools, each spool being of a size to accommodate film strip of 16 mm. width having perforations along each side thereof. The film strip is wound from one of the spools onto the other while one half of the width of film strip is being exposed in the camera. To expose the other half of the film strip, the magazine is reversed in the camera and the film strip is advanced in the opposite direction back onto what was the original supply spool. After processing, the film strip is split into two strips and spliced together on one end, the resulting strip being 8 mm. wide and having perforations along one edge only. The 8 mm. width strip can then be used in suitable 8 mm. projection apparatus or as otherwise desired.

Since the magazine must be reversed within the 8 mm. motion-picture camera after the first half of the film strip width has been exposed, the opposite sides of the magazine are usually similar in configuration, each side including means permitting a different one of the spools within the magazine to be driven by the camera drive mechanism. It is desirable to provide an antisnubbing means for the film strip coming off of the supply spool and snubbing means for the film strip being wound onto the take-up spool so that the driven take-up spool is unable to unwind film strip from the supply spool, but instead will only wind up that amount of film strip which has been unwound from the supply spool by the film advancing mechanism, usually located in the film gate of the motion-picture camera. On the other hand, the film strip coming from the supply spool passes over an antisnubber and, therefore, the film advancing mechanism is able to draw the film strip freely from the supply spool. When the magazine is reversed in the camera, what formerly was the supply spool becomes the take-up spool in effect, and a snubbing means is required for the film strip being wound onto the new take-up spool and an antisnubbing means is required for what was formerly the take-up spool but which is now in effect the new supply spool.

Many devices have been designed to provide the described snubbing and antisnubbing of the film strip within the magazine. Some of the better known devices utilize metal springs or clips and while these have been successful to a certain extent, one difficulty which often arises results from the malfunctioning of the spring or jamming of the clip so that the camera fails to advance the film strip properly and a poor photographic record is obtained. The present invention was designed to overcome the difficulties encountered with the known prior art devices and comprises broadly an antisnubbing device, carried in the film handling apparatus and adapted to enter into the interior of a magazine of the type containing a movable film strip and means for snubbing the movement of the film strip therein, said antisnubbing device engaging the film strip within the magazine and forming a supplementary guide for the film strip around the snubbing means, thereby relieving the snubbing effect of said snubbing means on the movable film strip.

The primary object of the present invention is, therefore, to provide in a film handling apparatus adapted to receive a removable film magazine containing means for snubbing the movement of film strip therein, an antisnubbing device carried by said apparatus and entering into the magazine upon locating the magazine in operating position in the apparatus for relieving the snubbing action of the snubbing means on the film strip.

Another object of the present invention is to provide in a film handling apparatus adapted to receive a removable film magazine containing a movable film strip and means for snubbing the movement of the film strip therein, an arrangement for relieving the snubbing effect of said snubbing means comprising a projection mounted in said apparatus and extending into the magazine when in operating position in the apparatus for engaging the film strip adjacent to the snubbing means and for guiding the film strip around the snubbing means.

Yet another object of the present invention is to provide a relatively simple and inexpensive arrangement for relieving the snubbing action of fixed snubbing means carried in a film magazine containing a movable film strip, said arrangement being operative when the magazine is placed in operating position in a film handling apparatus.

Still other objects and advantages of the present invention will become readily apparent to those skilled in the art from the following description with reference to the drawing in which like characters denote like parts and wherein:

FIG. 1 illustrates the antisnubbing arrangement of the present invention utilized in conjunction with a magazine-receiving motion-picture camera. The magazine is shown in an open position in order to facilitate the description and understanding of the invention.

FIG. 2 is a perspective view showing the film magazine aligned with the mechanism plate of a motion-picture camera just prior to the mounting of the magazine over the drive spindle, locating pin, and antisnubbing means on the mechanism plate;

FIGS. 3 and 4 are horizontal and vertical elevation views showing the preferred structure of the antisnubbing means of the present invention; and FIG. 5 is a cross-sectional view taken along 5—5 of FIG. 1, but with the magazine covers closed to further illustrate the construction of the magazine.

In FIG. 1 the numeral 11 designates generally a motion-picture camera having an optical system 13, a film gate 15, and a mechanism plate 17. Mechanism plate 17 forms a dividing wall separating the magazine receiving cavity of the camera from the mechanism cavity, said mechanism cavity containing the various operating and drive elements (not shown) of the motion-picture camera. The structure of the optical system 13, the film gate 15, and drive elements is conventional; and since these do not form a part of the present invention, such structures have not been shown in greater detail. A driving spindle 21 extends through mechanism plate 17 and is of sufficient length to engage the flanged core 23 in magazine M. If the magazine is reversed in the camera, spindle 21 engages the hub 25 of supply spool 27. A positioning pin 31 and an antisnubber pin 33 are also mounted on the mechanism plate 17 for engagement with the magazine M in a manner which will be hereinafter set forth.

Magazines M is formed by two covers 35 and 37 which are hinged together as indicated at 39 along the back edge of the magazine. Covers 35 and 37 are identical except that a lip 47 is formed along the outside edge of cover 37 and a shoulder 49 is formed along the outside edge of cover 35, whereby when the two covers are closed as shown in FIG. 2 and FIG. 5, lip 47 fits down into the shoulder 49 and forms a light seal around the outside of the magazine. Covers 35 and 37 are each formed with a well 51 for accommodating the flanged supply spool 27 and with a well 53 for receiving the flanged core 23 and the film strip F which is wound thereon during the exposure of the first half of the film strip. A partition 55 exists between wells 51 and 53 in each cover; and when the covers 35 and 37 are closed, the opposed surfaces of the partition are in abutment.

During exposure of the first half of film strip F, the film strip is conducted from the supply spool 27 through the restricted passageways 57 and 59 and onto the flanged core 23. The restricted passageways 57 and 59 are of sufficient depth to permit the film strip F to be loosely confined between the bottom and top of the passageways when the covers are closed, such as is best illustrated in FIG. 5. The passageways 57 and 59 are substantially V-shaped in cross section so that when covers 35 and 37 are closed, a "diamond" shaped channel for the film strip is formed as indicated in FIG. 5. Thus, only the edges of the film strip are in contact with the magazine and there can be no scratching of that portion of the film strip on which the photographic images are exposed. At the inner end of each passageway 57 and 59 relatively sharp corners 71 and 73 respectively are formed. The relatively short radius corners 71 and 73 coact with the restricted passageways 57 and 59 to control the advance of the film strip F as it is unwound from the supply spool 27 and wound onto the flanged core 23. In effect corners 71 and 73 act as snubbing means or snubbers causing the film strip to bind as it is pulled around the corners and through the narrow passageways 57 and 59. Thus movement of the film strip within the magazine is "snubbed" on the corners 71 and 73. While snubbing of the film strip being wound onto the flanged core 23 is desired in order to prevent the spindle-driven flanged core 23 from pulling the film strip through the film gate 15 at a rate faster than the film advancing mechanism (not shown) in the film gate 15 normally advances film strip therethrough, it is imperative that the film advancing mechanism be able to draw the film strip F smoothly and without hindrance from the supply spool 27. Antisnubber pin 33 is rigidly mounted on mechanism plate 17 as best illustrated in FIG. 3 and FIG. 4 and comprises a relatively pointed end 81 which is the apex of an off-axis conoidal portion 83, a peripheral surface 85 which acts as a supplementary guide for the film strip around the corner 71 or 73, and a locating surface 87 which engages the cover of magazine M. Flat 89 provided on one side of antisnubber pin 33 permits the pointed end 81 to be positioned very close to corner 71 or 73 as the case may be, when magazine M is in operating position in the camera. This construction ensures first the engagement of the pointed end 81 with the film strip F and second the guiding of the film strip along the conoidal portion 83 onto peripheral surface 85 whereby the film strip will be guided in a relatively large radius path determined by surface 85 around corner 71 or 73 as the case may be.

In order that pin 33 may enter magazine M with surface 87 in engagement with the magazine, an aperture 91 is provided in cover 35 and a similar aperture 93 is provided in cover 37, aperture 93 being used when the magazine M is reversed in the camera for exposure of the second half of the film strip. Two small apertures 95 and 97 are provided in covers 35 and 37 respectively for receiving the relatively short positioning pin 31 mounted on the mechanism plate 17. Pin 31 together with surface 87 of pin 33 accurately locate the magazine on mechanism plate 17 in the magazine receiving cavity of the camera. It should be noted that the positioning pin 31 is not sufficiently long to extend into the interior of the magazine M and therefore does not interfere with the normal movement of film strip F therein. If desired, it is possible to eliminate pin 31 and instead to provide a stop member (not shown) is the magazine receiving cavity for positively engaging an exterior surface of magazine M and thereby preventing movement of the magazine about pin 31. Cover 35 of magazine M also includes an opening (not visible in the drawings) opposite the flanged core 23 for receiving the driving spindle 21. This opening is identical to opening 99 formed in cover 37. The openings permit the driving spindle 21 to engage the flanged core 23 or hub 25, as the case may be, and to rotate the same for winding film strip F thereon. A suitable clip 101 is utilized to fasten the two covers 35 and 37 of magazine M together.

The operation of the motion-picture camera and magazine utilizing an antisnubbing arrangement in accordance with the present invention, will now be described. When ready for use in a camera, the magazine M is closed as shown in FIG. 2. The film strip F is contained on spool 27, but one end of the film strip is attached to flanged core 23. Thus part of the film strip F extends across the open space outside of magazine M as shown in FIG. 2. The film strip F is inserted into the film gate 15 in the usual manner as magazine M is positioned in the magazine receiving cavity of the camera with the pin 31 engaging aperture 95. Antisnubber pin 33 passes through aperture 91 and extends into the interior of the magazine to engage film strip F. Film strip F, which may have been adjacent to the sharp corner 71, is engaged by the pointed end 81 of pin 33 and is guided onto the peripheral surface 85 by the conoidal portion 83 of pin 33 and away from the corner 71. Thus, film strip F is guided in a relatively large radius loop around the antisnubber pin 33. After the cover plate (not shown) of camera 11 is closed and the film advancing mechanism in film gate 15 engages film strip F in the known manner, the film strip F during operation of the camera, is intermittently advanced from supply spool 27 toward flanged core 23 which acts as a take-up spool. Flanged core 23 is continuously driven by the spindle 21 in the known manner and film strip F tends to be continuously wound onto the flanged core 23. In the event that flanged core 23 is rotated at a rate such that the film strip tends to be wound thereon faster than the film strip is advanced through the film gate 15, then the film strip F forms a relatively short radius loop around and in contact with the sharp corner 73, and binds around the sharp corner, or is snubbed as referred to in the art, with the result that the tension in the film strip occasioned by the turning of flanged core 23, is not transmitted to that portion of the film strip then located in the film gate 15 or to the film spool 27. After the film strip F has been advanced completely from the supply spool 27 onto the flanged core 23, except for the end of the film strip which remains attached to the spool 27, it is necessary to open up the cover plate (not shown) of the camera and reverse the magazine M in the magazine receiving cavity. When reversed, magazine positioning pin 31 engages small aperture 97, antisnubber pin 33 enters aperture 93 and engages film strip F in a manner similar to that described above, and spindle 21 engages the hub 25 of supply spool 27 through opening 99. The film strip F is then positioned in the film gate 15 in the usual manner. At this point in the use of the magazine M, it will be understood that the positions occupied by the film strip F are identical to those which previously obtained except that the film strip is now drawn by the film advancing mechanism upon operation of the camera, from flanged core 23 through film gate 15 and is wound onto the spindle driven supply spool 27.

It should now be readily apparent to those skilled in the art that we have provided a relatively simple and inexpensive arrangement for relieving the snubbing action of fixed snubbing means carried in a film magazine containing a movable film strip, when the magazine is placed in operating position in a film handling apparatus.

While a preferred embodiment of the present invention has been illustrated and described, many modifications and variations are possible and will become readily apparent to those skilled in the art from the foregoing description. For example, it would be possible to obtain the same desirable results obtained by the structure of the preferred embodiment, if corners 71 and 73 were made expansible or deflectable, upon insertion of an actuating means or projection carried on mechanism plate 17 into the magazine M in engagement with the corners, from a position and shape corresponding to that of corners 71 and 73 to ones corresponding to that of the peripheral surface 85 on pin 33. Still other modifications and variations are possible; and, therefore, the foregoing description is intended to be illustrative only and the scope of the invention is defined by the appended claims.

Having now particularly described our invention, what we desire to secure by Letters Patent of the United States and what we claim is:

1. In strip handling apparatus adapted to receive a removable magazine containing a movable strip and means defining a tortuous path having at least one relatively sharp bend for guiding said strip during movement thereof, an arrangement for relieving the snubbing effect at said bend of said guiding means on said strip comprising a projection fixed in position in said apparatus and disposed to extend into the magazine between the strip and said guiding means at said bend when the magazine is received in said apparatus, said projection having a rounded peripheral surface which forms a supplementary guide of enlarged radius for the strip at said bend and a relatively pointed end which is adapted to engage the strip adjacent to said bend for guiding the strip onto said peripheral surface.

2. In strip handling apparatus an arrangement in accordance with claim 1 wherein said pointed end is a conoidal portion having its apex juxtaposed to said guiding means at said bend when the magazine is received in said apparatus to thereby facilitate guiding of the strip onto said peripheral surface and wherein said projection is adapted to engage said magazine to orient the same when received in said apparatus.

References Cited in the file of this patent

UNITED STATES PATENTS

| | | |
|---|---|---|
| 1,933,562 | Michel | Nov. 7, 1933 |
| 1,944,030 | Foster et al. | Jan. 16, 1934 |
| 2,039,108 | Owens | Apr. 28, 1936 |
| 2,391,497 | Wilson et al. | Dec. 25, 1945 |
| 2,577,162 | Smith et al. | Dec. 4, 1951 |
| 2,702,834 | Golle et al. | Feb. 22, 1955 |
| 2,852,254 | Reiskind | Sept. 16, 1958 |